(12) United States Patent
Kezuka et al.

(10) Patent No.: US 7,384,705 B2
(45) Date of Patent: Jun. 10, 2008

(54) ELECTRODE AND BATTERY, AND METHODS OF PRODUCING THE SAME

(75) Inventors: Koichiro Kezuka, Miyagi (JP); Takahiro Endo, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/792,708

(22) Filed: Feb. 23, 2001

(65) Prior Publication Data

US 2001/0019797 A1    Sep. 6, 2001

(30) Foreign Application Priority Data

Feb. 23, 2000    (JP)    ............................ P2000-052198

(51) Int. Cl.
*H01M 4/02* (2006.01)
(52) U.S. Cl. ...................... 429/211; 429/209
(58) Field of Classification Search ................ 429/211, 429/212, 213, 300
See application file for complete search history.

(56) References Cited

U.S. PATENT DOCUMENTS

| 3,973,991 | A | * | 8/1976 | Cestaro et al. | ............... 429/225 |
| 5,397,659 | A | * | 3/1995 | Imhof et al. | ................ 429/161 |
| 5,631,103 | A | * | 5/1997 | Eschbach et al. | ............ 429/190 |
| 5,709,965 | A | * | 1/1998 | Grivel et al. | ................ 429/158 |
| 5,871,861 | A | * | 2/1999 | Hirokou et al. | ............. 429/149 |
| 6,040,086 | A | * | 3/2000 | Yoshida et al. | ............. 429/211 |
| 6,440,604 | B1 | * | 8/2002 | Inoue et al. | ................ 429/211 |

FOREIGN PATENT DOCUMENTS

| EP | 0 869 564 A1 | 10/1998 |
| JP | 07328774 | 12/1995 |

* cited by examiner

*Primary Examiner*—Stephen Kalafut
*Assistant Examiner*—Julian Mercado
(74) *Attorney, Agent, or Firm*—Sonnenschein Nath & Rosenthal LLP

(57) ABSTRACT

An electrode for a battery includes an electrode sheet, a lead, and a metal piece. The electrode sheet has a collector, an active material layer formed on the collector, and a lead connecting portion which is configured as an exposed extension of the collector, on both surfaces of which the active material layer is not formed. The lead connecting portion, the lead, and the metal piece are overlapped to and joined to each other. With this configuration, even if a contact area between the lead connecting portion and the lead is small, an electric resistance at the joined portion between the lead connecting portion and the lead becomes small, with a result that it is possible to enhance the strength of the joined portion and to enhance the discharge load characteristic of the battery.

13 Claims, 10 Drawing Sheets

F I G. 12
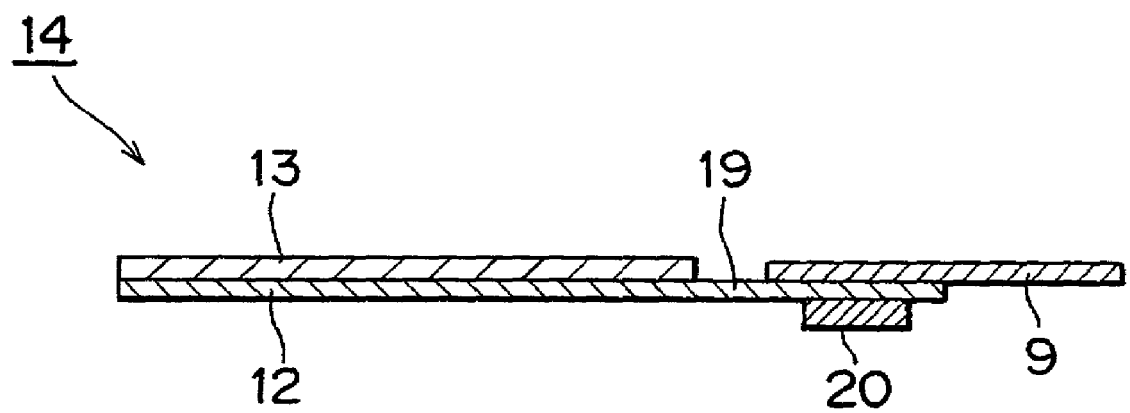
F I G. 13
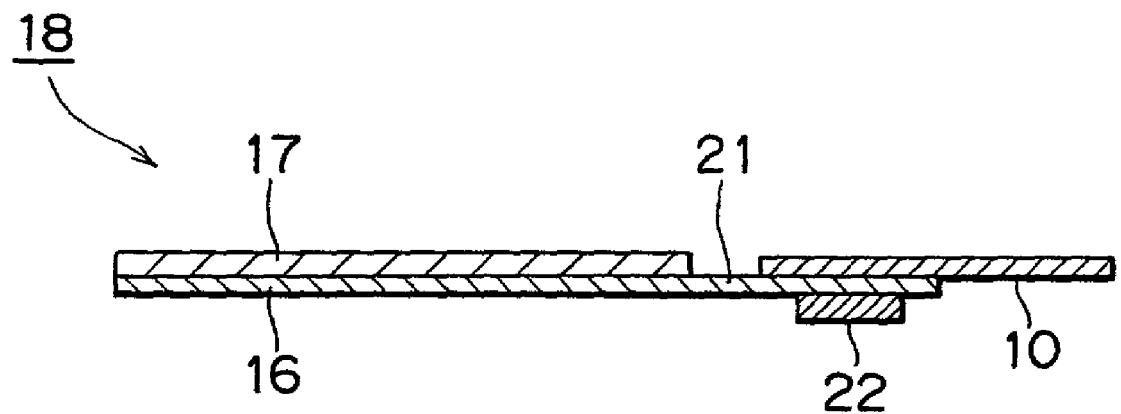

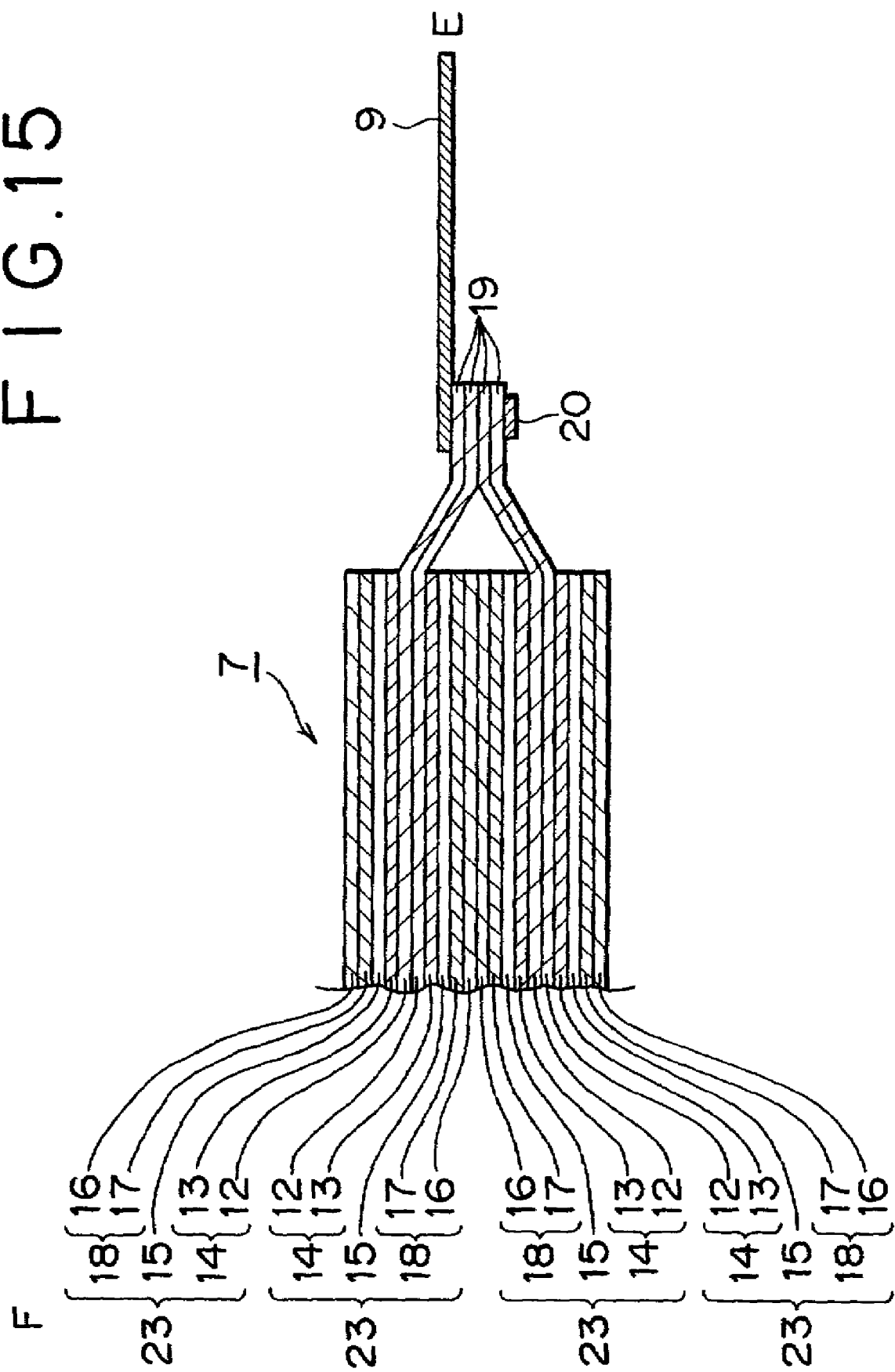

ELECTRODE AND BATTERY, AND METHODS OF PRODUCING THE SAME

BACKGROUND OF THE INVENTION

The present invention relates to an electrode to which a lead is connected and a production method thereof, and a battery using the electrode and a production method thereof.

In recent years, along with the recent progress of the electronic technology, there have been developed small-sized portable electronic apparatuses such as camera integrated video tape recorders and portable information terminals. To cope with the tendency to reduce sizes of these portable electronic apparatuses and to enhance performances thereof, there have been strong demands to develop small-sized, lightweight batteries having high performances as portable power sources used for these electronic apparatuses.

In particular, to drive an electronic apparatus requiring a large pulse current, it is important to use a battery having a high discharge load characteristic as a power source of the electronic apparatus. To realize such a battery, an electrolytic solution, an active material, and the like of the battery have been actively studied.

The performance of a battery is also dependent on constituent members, irrelevant to battery reaction, of the battery, for example, an electrode lead, a collector, and a connection portion therebetween. In particular, to improve the discharge load characteristic of a battery, it becomes important to reduce resistances of these constituent members.

For example, a gel-like electrolyte battery using a gel-like electrolyte has an electrode sheet formed by stacking a negative electrode, the gel-like electrolyte, and a positive electrode to each other; an outer case formed by folding one laminated sheet into two, in which the electrode sheet is sealed; a negative electrode lead, one end of which is extracted to the outside of the outer case; and a positive electrode lead, one end of which is extracted to the outside of the outer case.

FIG. 1 shows an electrode configuration of each of a negative electrode and a positive electrode of a related art gel-like electrolyte battery. The electrode includes a collector 50, an active material layer 51 formed on the collector 50, and a lead connecting portion 52 configured as an exposed extension of the collector 50, on which the active material layer 51 is not formed. One end of a lead 53 is connected to the lead connecting portion 52. FIG. 2 shows another electrode configuration of each of a negative electrode and a positive electrode of a related art gel-like electrolyte battery. The electrode includes a stack of a plurality of electrode sheets each having a collector 50, an active material layer 51, and a lead connecting portion 52. The plurality of lead connecting portions 52 are overlapped to each other, and one end of a lead 53 is joined to the overlapped lead connecting portions 52.

As disclosed, for example, in Japanese Patent Laid-open No. Hei 11-233096, the lead 53 can be joined to the lead connecting portion 52 by ultrasonic welding. This is effective to join the lead 53 to the lead connecting portion 52 without occurrence of cutout or breakage due to generation of spark.

In the above-described methods shown in FIGS. 1 and 2, however, if a metal foil used as the collector 50 is thin, the contact state between the lead 53 and the lead connecting portion 52 is not desirable at the joined portion between the lead 53 and the lead connecting portion 52, with a result that the joining strength between the lead 53 and the lead connecting portion 52 becomes insufficient. That is to say, since the mechanical strength of the joined portion between the lead 53 and the lead connecting portion 52 is poor, there may occur a problem that the lead 53 be peeled only by a slight tensile force applied thereto.

Further, if the contact state between the lead 53 and the lead connecting portion 52 is insufficient, the electric resistance therebetween becomes large, whereby the inner resistance of the battery is increased. As a result, there may occur a problem that the discharge load characteristic of the battery is degraded.

In particular, for a so-called stack-type battery in which a battery element is formed not by winding a negative electrode and a positive electrode but by stacking them to each other, to improve the capacity of the battery, it is regarded desirable to make the lead connecting portion 52 irrelevant to battery reaction as small as possible. Accordingly, for the stack-type battery, the contact area between the lead 53 and the lead connecting portion 52 becomes small as compared with the winding type battery, with a result that the above-described problems, that is, the reduction in joining strength and degradation of discharge load characteristic become significant.

SUMMARY OF THE INVENTION

An object of the present invention is to provide an electrode and a battery, each of which is capable of increasing, even if the contact area between a lead and a lead connecting portion is small, the strength of a joined portion between the lead and the lead connecting portion, and also reducing the electric resistance of the joined portion thereby ensuring a high discharge load characteristic, and to provide methods of producing the electrode and the battery.

To achieve the above object, according to a first aspect of the present invention, there is provided an electrode including: an electrode sheet, a lead, and a metal piece. The electrode sheet has a collector, an active material layer formed on the collector, and a lead connecting portion which is configured as an exposed extension of the collector, on both surfaces of which the active material layer is not formed. The lead connecting portion, the lead, and the metal piece are overlapped to and joined to each other.

With this configuration, since the metal piece is joined to the joined portion between the lead and the lead connecting portion at a position corresponding to an approximately central area of the joined portion, the contact state between the lead and the lead connecting portion can be made significantly desirable.

According to a second aspect of the present invention, there is provided an electrode including: an electrode sheet set including a plurality of electrode sheets, a lead, and a metal piece. Each of the electrode sheets has a collector, an active material layer formed on the collector, and a lead connecting portion which is configured as an exposed extension of the collector, on both surfaces of which the active material layer is not formed. The lead connecting portions of the plurality of electrode sheets, the lead, and the metal piece are overlapped to and joined to each other.

With this configuration, since the metal piece is joined to the joined portion between the lead and the lead connecting portions at a position corresponding to an approximately central area of the joined portion, the contact state between the lead and the lead connecting portions can be made significantly desirable.

According to a third aspect of the present invention, there is provided a battery including a negative electrode, a positive electrode, and an electrolyte. At least one of the negative electrode and the positive electrode includes an electrode sheet, and a lead, and a metal piece. The electrode sheet has a collector, an active material layer formed on the collector, and a lead connecting portion which is configured as an exposed extension of the collector, on both surfaces of which the active material layer is not formed. The lead connecting portion, the lead, and the metal piece are overlapped to and joined to each other.

With this configuration, since the metal piece is joined to the joined portion between the lead and the lead connecting portion at a position corresponding to an approximately central area of the joined portion, the contact state between the lead and the lead connecting portion can be made significantly desirable, and the discharge load characteristic of the battery can be improved.

According to a fourth aspect of the present invention, there is provided a battery including a negative electrode, a positive electrode, and an electrolyte. At least one of the negative electrode and the positive electrode includes an electrode sheet set including a plurality of electrode sheets, a lead, and a metal piece. Each of the electrode sheets has a collector, an active material layer formed on the collector, and a lead connecting portion which is configured as an exposed extension of the collector, on both surfaces of which the active material layer is not formed. The lead connecting portions of the plurality of electrode sheets, the lead, and the metal piece are overlapped to and joined to each other.

With this configuration, since the metal piece is joined to the joined portion between the lead and the lead connecting portions at a position corresponding to an approximately central area of the joined portion, the contact state between the lead and the lead connecting portions can be made significantly desirable, and the discharge load characteristic of the battery can be improved.

According to a fifth aspect of the present invention, there is provided a method of producing an electrode including an electrode sheet, and a lead. The electrode sheet has a collector, an active material layer formed on the collector, and a lead connecting portion which is configured as an exposed extension of the collector, on both surfaces of which the active material layer is not formed. The method includes a metal piece joining step of overlapping and joining the lead connecting portion, the lead, and a metal piece to each other.

With this configuration, a battery in which the contact state between the lead and the lead connecting portion is significantly improved can be obtained by joining the metal piece to the joined portion between the lead and the lead connecting portion.

According to a sixth aspect of the present invention, there is provided a method of producing an electrode including: an electrode sheet set including a plurality of electrode sheets, and a lead. Each of the electrode sheets has a collector, an active material layer formed on the collector, and a lead connecting portion which is configured as an exposed extension of the collector, on both surfaces of which the active material layer is not formed. The method includes a metal piece joining step of overlapping and joining the lead connecting portion, the lead, and a metal piece to each other.

With this configuration, a battery in which the contact state between the lead and the lead connecting portions is significantly improved can be obtained by joining the metal piece to the joined portion between the lead and the lead connecting portions.

According to a seventh aspect of the present invention, there is provided a method of producing a battery including a negative electrode, a positive electrode, and an electrolyte. At least one of the negative electrode and the positive electrode includes an electrode sheet, and a lead. The electrode sheet has a collector, an active material layer formed on the collector, and a lead connecting portion which is configured as an exposed extension of the collector, on both surfaces of which the active material layer is not formed. The method includes a metal piece joining step of overlapping and joining the lead connecting portion, the lead, and a metal piece to each other.

With this configuration, a battery in which the contact state between the lead and the lead connecting portion is significantly improved can be obtained by joining the metal piece to the joined portion between the lead and the lead connecting portion. The battery thus produced exhibits a high discharge load characteristic.

According to an eighth aspect of the present invention, there is a method of producing a battery including a negative electrode, a positive electrode, and an electrolyte. At least one of the negative electrode and the positive electrode includes an electrode sheet set including a plurality of electrode sheets, and a lead. Each of the electrode sheets has a collector, an active material layer formed on the collector, and a lead connecting portion which is configured as an exposed extension of the collector, on both surfaces of which the active material layer is not formed. The method includes a metal piece joining step of overlapping and joining the lead connecting portion, the lead, and a metal piece to each other.

With this configuration, a battery in which the contact state between the lead and the lead connecting portions is significantly improved can be obtained by joining the metal piece to the joined portion between the lead and the lead connecting portions. The battery thus produced exhibits a high discharge load characteristic.

BRIEF DESCRIPTION OF THE DRAWINGS

FIG. 12 is a schematic sectional view of an essential portion of a negative electrode used for the nonaqueous electrolyte battery shown in FIG. 10;

FIG. 13 is a schematic sectional view of an essential portion of a positive electrode used for the nonaqueous electrolyte battery shown in FIG. 10;

FIG. 15 is a schematic sectional view, taken on line E-F of FIG. 10, showing an essential portion, at which negative electrode lead connecting portions, a negative electrode lead, and a metal piece are joined to each other, of the nonaqueous electrolyte battery shown in FIG. 14;

DETAILED DESCRIPTION OF THE PREFERRED EMBODIMENTS

Hereinafter, preferred embodiments of the present invention will be described with reference to the drawings.

Figure 3:
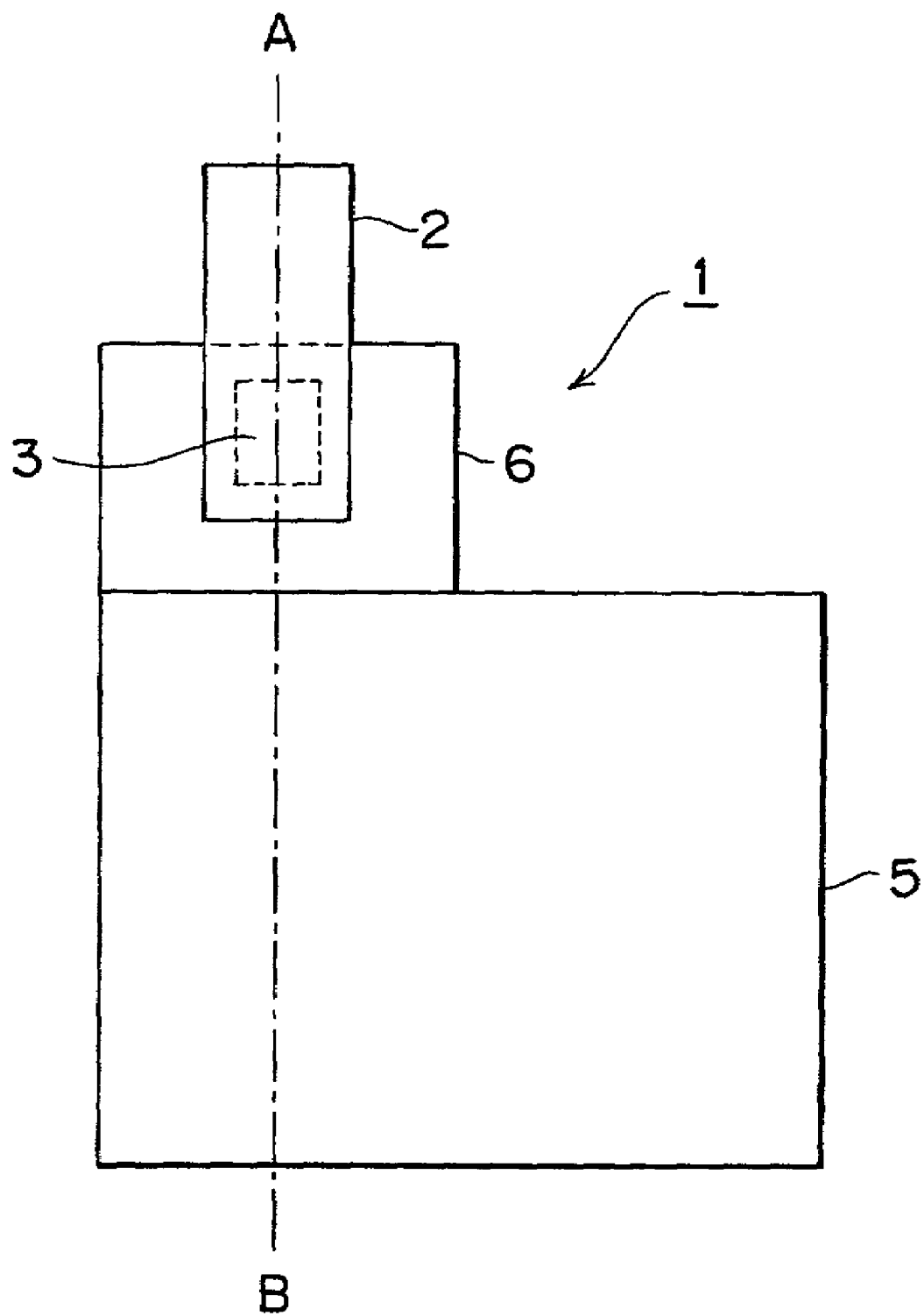
FIG. 3 is a plan view showing one configuration example of an electrode of the present invention.
Figure 4:
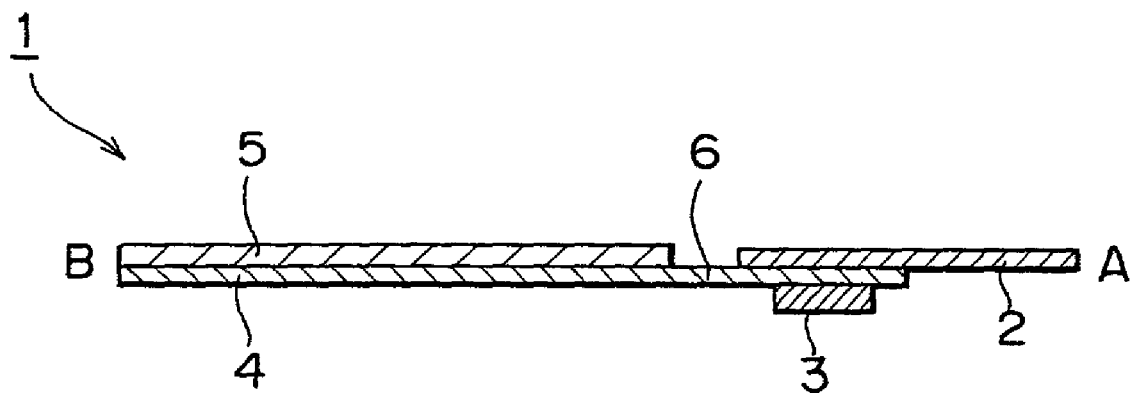
FIG. 4 is a sectional view, taken on line A-B of FIG. 3, showing the electrode shown in FIG. 3.

Referring to FIGS. 3 and 4, an electrode to which the present invention is applied includes an electrode sheet 1, a long-sized lead 2, and a metal piece 3. The electrode sheet 1 includes an approximately rectangular collector 4, an active material layer 5 formed on the collector 4, and a lead connecting portion 6 configured as an extension of the collector 4, which is exposed as a portion on which the active material layer 5 is not formed.

To ensure the electric connection between the lead 2 and the lead connecting portion 6, a portion of the lead 2 is overlapped to and physically, electrically joined to a portion of the lead connecting portion 6. The metal piece 3 is overlapped to and joined to the lead connecting portion 6 at a position corresponding to an approximately central area of the joined portion between the lead 2 and the lead connecting portion 6. In this way, according to this embodiment, at least a portion of the lead 2, at least a portion of the lead connecting portion 6, and at least a portion of the metal piece 3 are stacked to and joined to each other.

Since the metal piece 3 is overlapped to and joined to the joined portion between the lead 2 and the lead connecting portion 6, the contact state between the lead 2 and the lead connecting portion 6 in the case of using the metal piece 3 can be made significantly desirable as compared with the contact state between the lead 2 and the lead connecting portion 6 in the case of using no metal piece 3. As a result, even if the contact area between the lead 2 and the lead connecting portion 6 is small, the joining strength of the lead 2 against a tensile force or the like can be improved, and the resistance of the joined portion between the lead 2 and the lead connecting portion 6 can be reduced.

Figure 5:
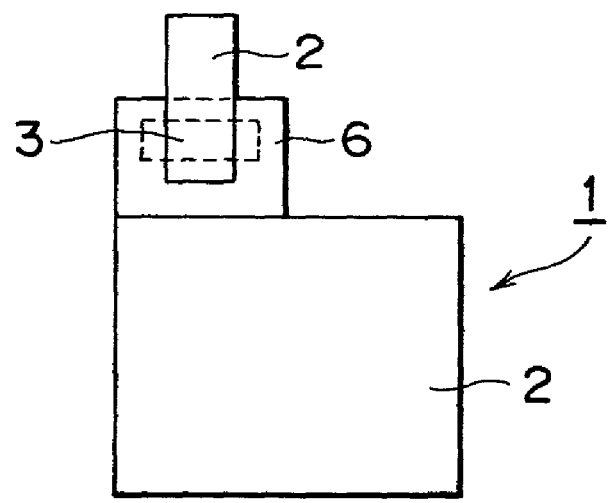
FIG. 5 is a plan view showing another configuration example of the electrode of the present invention.
Figure 6:
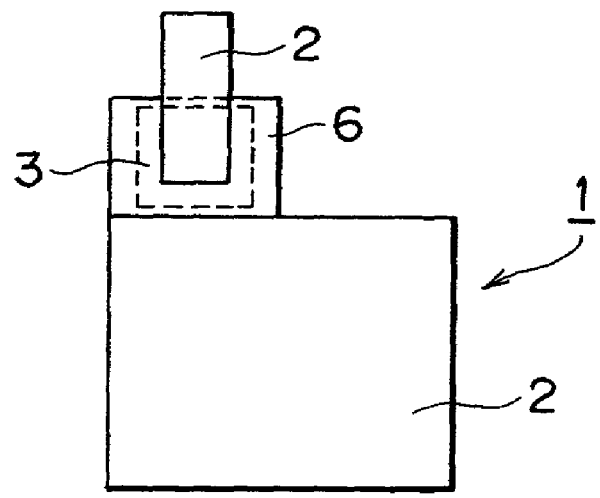
FIG. 6 is a plan view showing a further configuration example of the electrode of the present invention.

The size and area of the metal piece 3 are not particularly limited. For example, as shown in FIG. 5, the metal piece 3 may be formed into a strip shape, and be joined to the lead connecting portion 6 in a state in which part of the metal piece 3 be protruded from the lead 2 in the width direction of the lead 2. Also, as shown in FIG. 6, the area of one principal plane of the metal piece 3 may be larger than the contact area between the lead 2 and the lead connecting portion 6, and the metal piece 3 be joined to the lead connecting portion 6 in such a manner as to cover the contact area between the lead 2 and the lead connecting portion 6.

According to this embodiment, however, it may be preferred that the area of one principal plane of the metal piece 3 be smaller than the contact area between the lead 2 and the lead connecting portion 6 and the metal piece 3 be joined to a portion, positioned inside the contact portion with the lead 2, of the lead connecting portion 6. This arrangement of the metal piece 3 is effective to prevent, in the case of using this electrode for a battery to be contained in a laminate sheet, the laminate sheet from being brought into contact with burrs necessarily present on a peripheral edge of the metal piece 3.

If the metal piece 3 is made from the same material as that of the lead 2 and/or the collector 4, the contact state between the lead 2 and the lead connecting portion 6 can be made more desirable, with a result that the joining strength therebetween can be improved and the electric resistance of the contact portion therebetween can be reduced.

The thickness of the metal piece 3 is preferably in a range of 0.03 mm or more. If the thickness of the metal piece 3 is less than 0.03 mm, since the thickness of the metal piece 3 is excessively thin, the metal piece 3 may fail to sufficiently achieve the effect of improving the contact state between the lead 2 and the lead connecting portion 6.

In the above-described embodiment, the metal piece 3 is joined to the lead connecting portion 6 in the state in which the lead connecting portion 6 is held between the lead 2 and the metal piece 3; however, the present invention is not limited thereto. The metal piece 3 may be arranged at any location insofar as the electric contact between the lead 2 and the lead connecting portion 6 and a sufficient joining strength therebetween can be ensured by arrangement of the metal piece 3. For example, the metal piece 3 may be arranged in a state in which the lead 2 be held between the lead connecting portion 6 and the metal piece 3.

In the above-described electrode according to the embodiment, the metal piece 3 is joined to the portion, on which the lead 2 is joined, of the lead connecting portion 6; however, the present invention is not limited thereto but may be applicable to an electrode having a stack of a plurality of electrode sheets 1 each having a collector 4, an active material layer 5, and a lead connecting portion 6.

Figure 7:
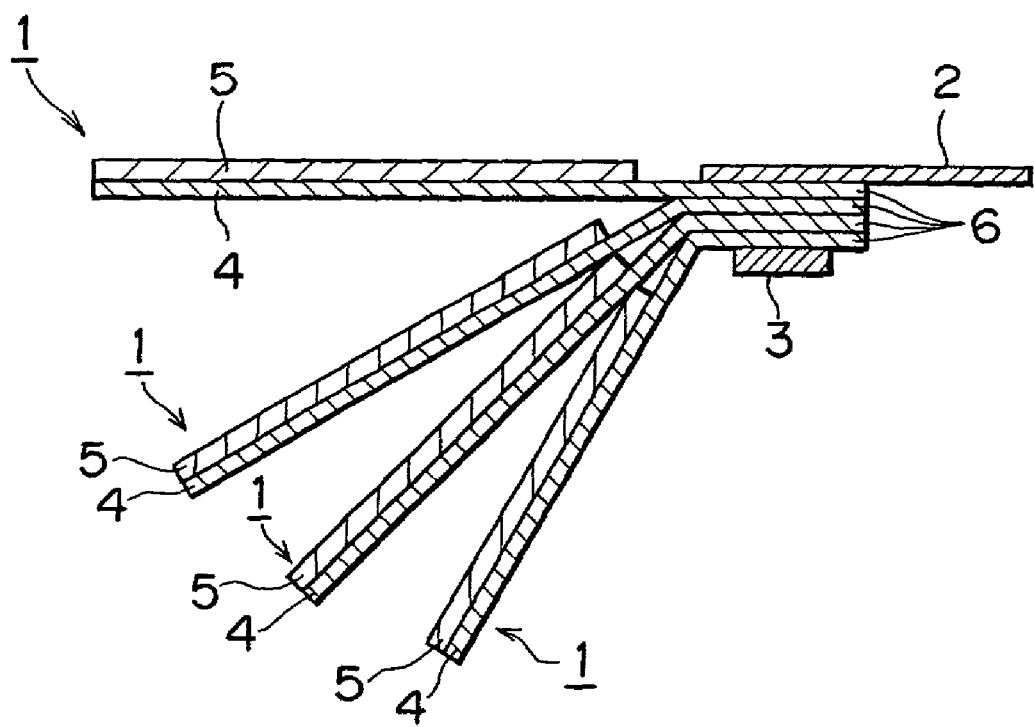
FIG. 7 is a schematic sectional view showing an essential portion of a further configuration example of the electrode of the present invention.

For example, as shown in FIG. 7, such an electrode includes a plurality of electrode sheets 1, lead connecting portions 6 extending from the plurality of electrode sheets 1, a lead 2, and a metal piece 3. The plurality of lead connecting portions are overlapped to each other, and the lead 2 is overlapped to and joined to the outermost one (uppermost one in the figure) of the overlapped lead connecting portions 6. The metal piece 3 is overlapped to and joined to the outermost one (lowermost one in the figure), opposed to the side on which the lead 2 is jointed, of the overlapped lead connecting portions 6 at a position corresponding to an approximately central area of the joined portion between the lead 2 and the outermost one (uppermost one in the figure) of the lead connecting portions 6. In this way, the metal piece 3 is joined to the outermost one of the plurality of the lead connecting portions 6 in the state in which the plurality of the lead connecting portions 6 are held between the lead 2 and the metal piece 3.

Figure 8:
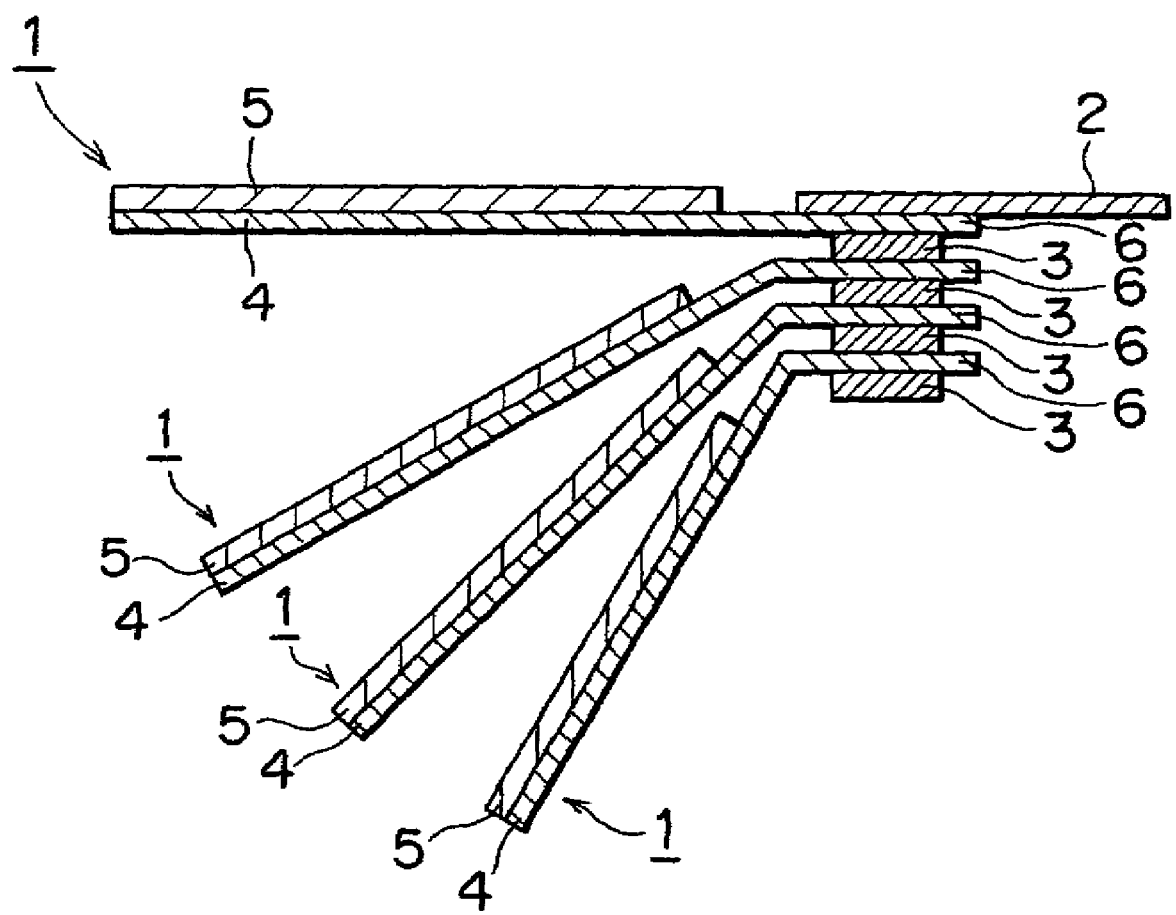
FIG. 8 is a schematic sectional view showing an essential portion of a further configuration example of the electrode of the present invention.
Figure 9:
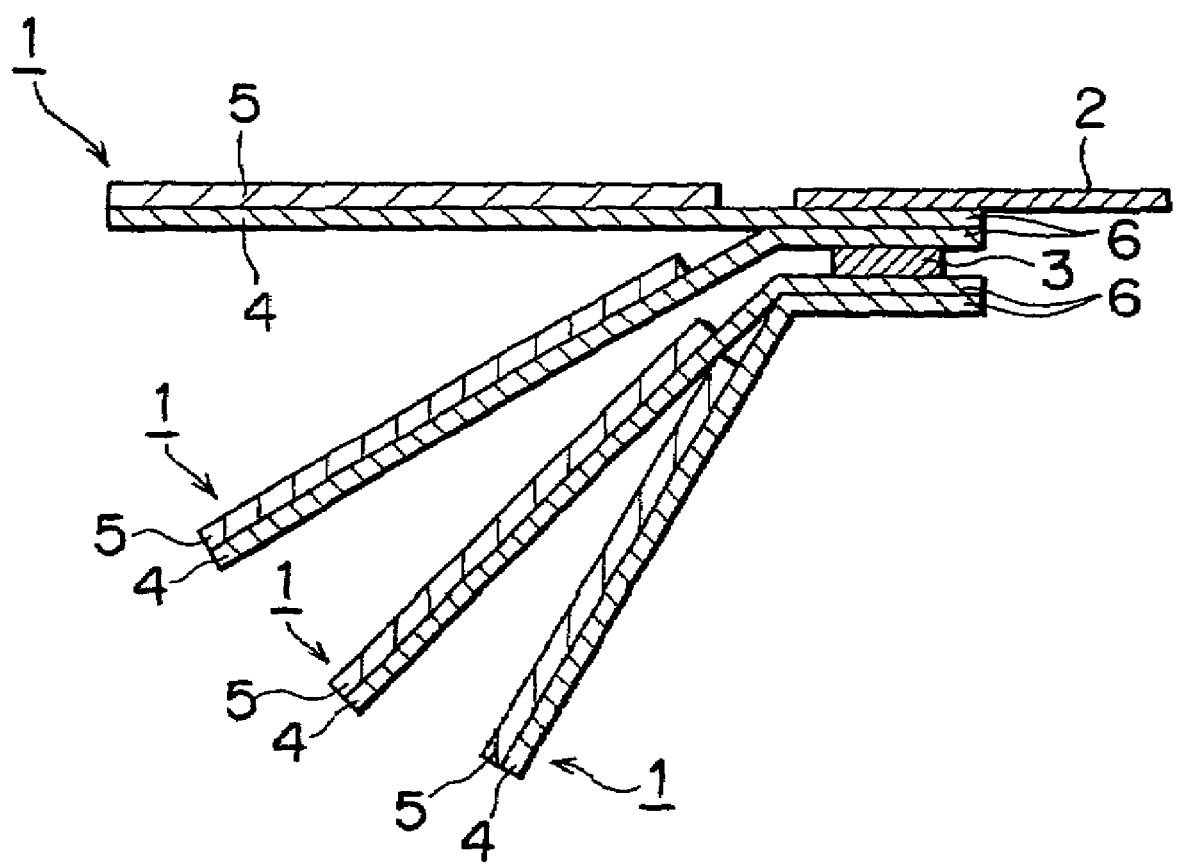
FIG. 9 is a schematic sectional view showing an essential portion of a further configuration example of the electrode of the present invention.

As shown in FIG. 8, a plurality of the metal pieces 3 may be arranged in such a manner that each of the metal pieces 3 be held between two, adjacent to each other, of the overlapped lead connecting portions 6. Further, as shown in FIG. 9, one metal piece 3 may be arranged in such a manner as to be held between arbitrary two, adjacent to each other, of the overlapped lead connecting portions 6. It should be noted that the number of the metal pieces 3 may be freely selected and the one or more metal pieces 3 may be arranged at any location or any locations insofar as the electric contact between the lead 2 and the lead connecting portions 6 and a sufficient joining strength therebetween can be ensured by arrangement of the one or more metal pieces 3.

According to the electrode in this embodiment, since the metal piece 3 is jointed to the joined portion between the lead 2 and the lead connecting portion 6, the contact state between the lead 2 and the lead connecting portion 6 can be made significantly desirable, to improve the joining strength between the lead 2 and the lead connecting portion 6 and reduce the electric resistance of the joined portion between the lead 2 and the lead connecting portion 6, thereby improving the discharge load characteristic of the battery using such an electrode.

The above-described electrode can be used as each of a negative electrode and a positive electrode of a battery, particularly, a nonaqueous electrolyte battery including a stack of a negative electrode and a positive electrode contained in a moisture-proof film and using a gel-like electrolyte or a solid electrolyte. One example of the nonaqueous electrolyte battery will be described below with reference to the drawings.

Figure 10:
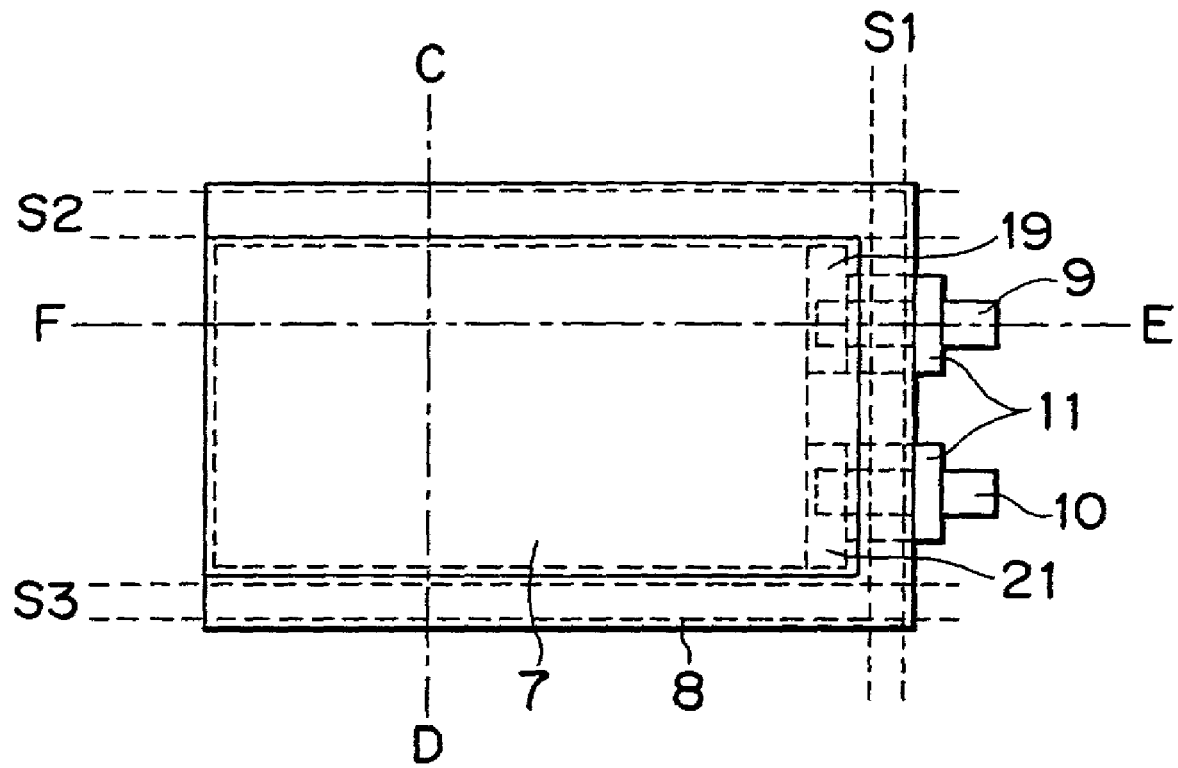
FIG. 10 is a plan view of a nonaqueous electrolyte battery of the present invention.

FIG. 10 shows a nonaqueous electrolyte battery in which the electrode having the above configuration is used as each of a negative electrode and a positive electrode. The nonaqueous electrolyte battery includes a battery element 7; an outer case 8 in which the battery element 7 is sealed; a negative electrode lead 9, one end of which is extracted to the outside of the outer case 8; a positive electrode lead 10, one end of which is extracted to the outside of the outer case 8; and sealants 11 for covering the negative electrode lead 9 and the positive electrode lead 10 in a sealing area S1 of the outer case 8, thereby enhancing the sealing characteristic of the outer case 8.

Figure 11:
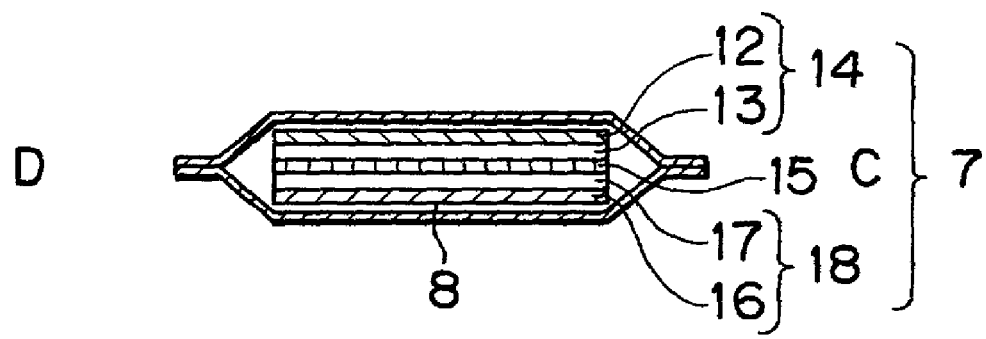
FIG. 11 is a sectional view, taken on line C-D of FIG. 10, showing the nonaqueous electrolyte battery shown in FIG. 10.

The battery element 7 is, as shown in FIG. 11, composed of a stack of a negative electrode 14 having a negative collector 12 and a negative active material layer 13, a gel-like electrolyte layer 15, and a positive electrode 18 having a positive collector 16 and a positive active layer material 17.

The negative electrode 14 has, as shown in FIG. 12, the negative collector 12, the negative active material layer 13 formed on the negative collector 12, and a negative electrode lead connecting portion 19, which is configured as an extension of the negative collector 12, on which the negative active material layer 13 is not formed. To ensure the electric connection between the negative electrode lead 9 and the negative electrode lead connecting portion 19, a portion of the negative electrode lead 9 is overlapped to and physically, electrically joined to a portion of the negative electrode lead connecting portion 19. A negative electrode metal piece 20 is overlapped to and joined to the negative electrode lead connecting portion 19 at a position corresponding to an approximately central area of the joined portion between the negative electrode lead 9 and the negative electrode lead connecting portion 19. In this way, at least a portion of the negative electrode lead 9, at least a portion of the negative electrode lead connecting portion 19, and at least a portion of the negative electrode metal piece 20 are stacked to and joined to each other.

The negative electrode metal piece 20 is preferably made from the same material of the negative collector 12 and/or the negative electrode lead 9. For example, the negative electrode metal piece 20 can be made from copper, nickel, or stainless steel.

The positive electrode 18 has, as shown in FIG. 13, the positive collector 16, the positive active material layer 17 formed on the positive collector 16, and a positive electrode lead connecting portion 21, which is configured as an extension of the positive collector 16, on which the positive active material layer 17 is not formed. To ensure the electric connection between the positive electrode lead 10 and the positive electrode lead connecting portion 21, a portion of the positive electrode lead 10 is overlapped to and physically, electrically joined to a portion of the positive electrode lead connecting portion 21. A positive electrode metal piece 22 is overlapped to and joined to the positive electrode lead connecting portion 21 at a position corresponding to an approximately central area of the joined portion between the positive electrode lead 10 and the positive electrode lead connecting portion 21. In this way, at least a portion of the positive electrode lead 10, at least a portion of the positive electrode lead connecting portion 21, and at least a portion of the positive electrode metal piece 22 are stacked to and joined to each other.

The positive electrode metal piece 22 is preferably made from the same material of the positive collector 16 and/or the positive electrode lead 10. For example, the positive electrode metal piece 22 can be made from aluminum, nickel, or stainless steel.

In the negative electrode 14, since the negative electrode metal piece 20 is joined to the joined portion between the negative electrode lead 9 and the negative electrode lead connecting portion 19, the contact state between the negative electrode lead 9 and the negative electrode lead connecting portion 19 in the case of using the negative electrode metal piece 20 can be made significantly desirable as compared with the contact state between the negative electrode lead 9 and the negative electrode lead connecting portion 19 in the case of using no negative electrode metal piece 20. As a result, even if the contact area between the negative electrode lead 9 and the negative electrode lead connecting portion 19 is small, the joining strength of the negative electrode lead 9 against a tensile force or the like can be improved, and the resistance of the joined portion between the negative electrode lead 9 and the negative electrode lead connecting portion 19 can be reduced.

Like the negative electrode 14, in the positive electrode 18, since the positive electrode metal piece 22 is joined to the joined portion between the positive electrode lead 10 and the positive electrode lead connecting portion 21, the contact state between the positive electrode lead 10 and the positive electrode lead connecting portion 21 in the case of using the positive electrode metal piece 22 can be made significantly desirable as compared with the contact state between the positive electrode lead 10 and the positive electrode lead connecting portion 21 in the case of using no positive electrode metal piece 22. As a result, even if the contact area between the positive electrode lead 10 and the positive electrode lead connecting portion 21 is small, the joining strength of the positive electrode lead 10 against a tensile force or the like can be improved, and the resistance of the joined portion between the positive electrode lead 10 and the positive electrode lead connecting portion 21 can be reduced. As a result, the discharge load characteristic of the entire battery can be improved.

In the above-described electrode, the metal piece is joined to each of the negative electrode 14 and the positive electrode 18; however, the metal piece may be joined to either the negative electrode 14 or the positive electrode 18.

In particular, the arrangement of the negative electrode metal piece 20 is significantly effective to the joining between the negative electrode lead 9 and the negative electrode lead connecting portion 19 because the material (typically, copper) of the negative electrode lead 9 is different from the material (typically, nickel) of the negative electrode lead connecting portion 19.

The negative collector 12 can be made from copper, nickel, or stainless steel, and can be formed into a shape of foil, lath, punching metal, or network.

The negative active material layer 13 is produced by coating the negative collector with a negative mix containing a negative active material and a binder, and drying the negative mix. In the case of applying the present invention to a lithium primary battery or a lithium secondary battery, as the negative active material, there is preferably used lithium, a lithium alloy such as lithium-aluminum alloy, or a material to or from which lithium can be doped or released. As the material to or from which lithium can be doped or released, there can be used a carbon material such as a difficult-to-graphitize carbon based material or a graphite based material. Specific examples of these carbon materials may include pyrolytic carbons, cokes such as pitch coke, needle coke, and petroleum coke, graphites, vitreous carbon fibers, sintered organic high polymer compounds, carbon fibers, and activated charcoals. The sintered organic high polymer compound is produced by sintering phenol resin or furan resin at a suitable temperature, thereby carbonizing the resin.

In addition to the above carbon material, a high polymer such as polyacetylene or polypyrrole, or an oxide such as $SnO_2$ can be used as the material to or from which lithium can be doped or released.

As the binder of the above negative mix, there can be used a known binder, which has been used for a negative mix for a general lithium ion battery. Further, known additives can be added to the negative mix.

As the material of the negative electrode lead 9, there can be used a known material, which has been used for a general negative electrode lead.

The positive collector 16 can be made from aluminum, nickel, or stainless steel, and can be formed into a shape of foil, lath, punching metal, or network.

As the positive active material, a metal oxide, a metal sulfide, or a specific high polymer can be used depending on the kind of the battery used.

For example, in the case of applying the present invention to a lithium primary battery, $TiS_2$, $MnO_2$, graphite, or $FeS_2$ can be used as the positive active material. In the case of applying the present invention to a lithium secondary battery, a metal sulfide such as $TiS_2$, $MoS_2$, or $NbSe_2$, or a metal oxide such as $V_2O_5$ can be used as the positive active material. Further, a transition metal oxide containing lithium, which is typically expressed by a chemical formula $LiMO_xO_2$ where M is one or more kinds of transition metals and x is a value depending on a charging/discharging state of the battery and usually set in a range of 0.05 to 1.10, can also be used as the positive active material. As the transition metals M contained in the transition metal oxide containing lithium, Co, Ni, and Mn are preferably used. Specific examples of the transition metal oxide containing lithium may include $LiCoO_2$, $LiNiO_2$, $LiN_yCO_{1-y}O_2$ (0<y<1), and $LiMn_2O_4$. Such a transition metal oxide containing lithium is used as the positive active material capable of generating a high voltage and ensuring a high energy density. From the viewpoint of ensuring a large capacity, an oxide of manganese or a composite oxide of lithium and manganese having a spinel type crystal structure is preferably used as the positive active material. The above-described positive active materials may be used for the positive electrode 18 singly or in combination.

As the material of the positive electrode lead 10, there can be used a known material, which has been used for a general positive electrode lead.

The gel-like electrolyte layer 15 contains an electrolyte salt, a matrix polymer, and a swelling solvent as a plasticizer.

Specific examples of the electrolyte salts may include $LiPF_6$, $LiClO_4$, $LiCF_3SO_3$, $LiAsF_6$, $LiBF_4$, $LiN(CF_3SO_3)_2$, and $C_4F_9SO_3Li$. These salts can be used singly or in combination. In particular, $LiPF_6$ is desirable from the viewpoint of ion conductivity.

The chemical structure of the matrix polymer is not particularly limited insofar as the matrix polymer itself or the gel-like electrolyte using the matrix polymer exhibits an ion conductivity of 1 mS/cm or more at room temperature. Specific examples of the matrix polymers may include polyvinylidene fluoride, polyacrylonitrile, polyethylene oxide, a polysiloxane based compound, a polyphosphazene compound, polypropylene oxide, polymethyl metacrylate, polymetacrylonitrile, and a polyether based compound. The above polymer may be copolymerized with another high polymer. From the viewpoints of chemical stability and ion conductivity, a material produced by copolymerization of polyvinylidene fluoride and polyhexafluoropropylene at a copolymerization ratio of less than 8 wt %.

As the swelling solvent, there can be used a nonaqueous solvent. Specific examples of the nonaqueous solvents may include ethylene carbonate, propylene carbonate, γ-butyrolactone, acetonitrile, diethyl ether, diethyl carbonate, dimethyl carbonate, 1,2-dimethoxyethane, dimethyl sulfoxide, 1,3-dioxolane, methyl sulfonate, 2-methyltetrahydrofuran, tetrahydrofuran, sulfolane, 2,4-diphloroanisole, and vinylene carbonate. These nonaqueous solvents can be used singly or in combination.

The material of the sealant 11 is not particularly limited insofar as it exhibits an adhesiveness against the positive electrode lead 10 and the negative electrode lead 9 but is preferably selected from polyolefine resins such as polyethylene, polypropylene, denaturated polyethylene, denaturated polypropylene, and copolymers thereof. The thickness of the sealant 11, in a state before heat seal, is preferably in a range of 20 μm to 300 μm. If the thickness of the sealant 11 is less than 20 μm, the handling characteristic of the sealant 11 becomes poor, and if the thickness of the sealant 11 is more than 300 μm, water is easier to permeate the sealant 11, thereby making it difficult to keep the air-tightness of the inside of the battery.

By covering the contact portions between the outer case 8 and the positive electrode 10 and between the outer case 8 and the negative electrode lead 9 with the sealant 11, it is possible to prevent the short-circuit of the outer case 8 due to burrs or the like and to improve the contact characteristics between the outer case 8 and the positive electrode lead 10 and between the outer case 8 and the negative electrode lead 9.

In the nonaqueous electrolyte battery having the above configuration, the negative electrode metal piece 20 is joined to the negative electrode lead connecting portion 19 at the position corresponding to an approximately central area of the joined portion between the negative electrode lead 9 and the negative electrode lead connecting portion 19, and the positive electrode metal piece 22 is joined to the positive electrode lead connecting portion 21 at the position corresponding to an approximately central area of the joined portion between the positive electrode lead 10 and the positive electrode lead connecting portion 21. Accordingly, it is possible to reduce the resistance of the joined portion between each lead and the corresponding lead connecting portion, and to improve the joining strength between the lead and the corresponding lead connecting portion. As a result, the inner resistance of the nonaqueous electrolyte battery can be reduced, to thereby enhance the discharge load characteristic of the battery.

In the above nonaqueous electrolyte battery, the stack of one negative electrode 14 and one positive electrode 18 is used for the battery element 7; however, the present invention is not limited thereto but may be applicable to a nonaqueous electrolyte battery in which an electrode configuration composed of a stack of a plurality of electrode sheets is used for the battery element 7.

Figure 14:
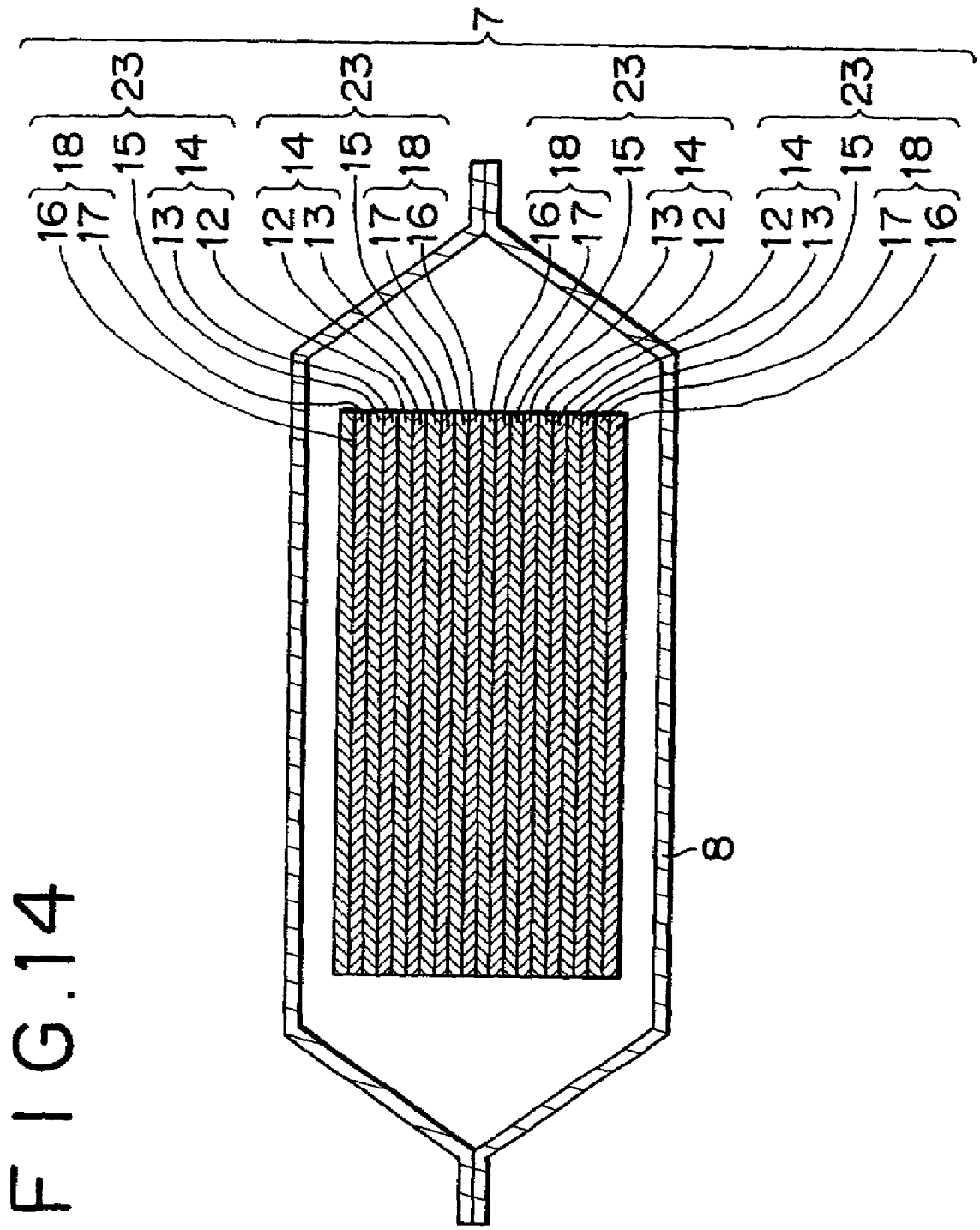
FIG. 14 is a sectional view, taken on line C-D of FIG. 10, showing an nonaqueous electrolyte battery in which a battery element includes a stack of a plurality of electrode sheets each having a negative electrode, a gel-like electrolyte layer, and a positive electrode.

For example, as shown in FIG. 14, such a battery element 7 has four electrode sheets 23 in each of which a negative electrode 14 having a negative collector 12 and a negative active material layer 13 is stacked on a positive electrode 18 having a positive collector 16 and a positive active material layer 17 via a gel-like electrolyte layer 15. In this battery element 7, the four electrode sheets 23 are stacked while being alternately turned back so that the negative electrode 14 of one electrode sheet 23 is in contact with the negative electrode 14 of the corresponding turned-back electrode sheet 23 and the positive electrodes 18 of one electrode sheet 23 is in contact with the positive electrode 18 of the corresponding turned-back electrode sheet 23. In this battery element 7, as shown in FIG. 15, negative electrode lead connecting portions 19 extending from the negative electrodes 14 are overlapped to each other, and a negative electrode lead 9 is joined to the outermost one (uppermost one in the figure) of the overlapped negative electrode lead connecting portions 19. A negative electrode metal piece 20 is overlapped to and joined to the outermost one (lowermost one in the figure), positioned on the side on which the negative electrode lead 9 is joined, of the overlapped negative electrode lead connecting portions 19 at a position corresponding to an approximately central area of the joined portion between the negative electrode lead 9 and the outermost one (uppermost one in the figure) of the overlapped negative electrode lead connecting portion 19. In this way, the negative electrode metal piece 20 is joined to the outermost one of the plurality of negative electrode lead connecting portions 19 in such a manner that the plurality of the negative electrode lead connecting portions 19 are held between the negative electrode lead 9 and the negative electrode metal piece 20.

Like the negative electrode 14, a positive electrode metal piece 22 can be joined to a plurality of positive electrode lead connecting portions 21 in such a manner that the plurality of positive electrode lead connecting portions 21 are held between a positive electrode lead 10 and the positive electrode metal piece 22.

As described above, since the lead is joined to the outermost one of the plurality of lead connecting portions overlapped to each other and the metal piece is joined to the opposed outermost one of the plurality of lead connecting portions at a position corresponding to the joined portion between the lead and the overlapped lead connecting portions, the joining between the lead and the plurality of lead connecting portions can be reinforced by the metal piece, to significantly enhance the contact state therebetween. As a result, it is possible to improve the joining strength between the lead and the plurality of lead connecting portions and reduce the electric resistance of the joined portion between the lead and the plurality of lead connecting portions, and hence to improve the discharge load characteristic of the battery.

In the above embodiment, the metal piece is joined to the plurality of lead connecting portions in such a manner that the plurality of lead connecting portions are held between the lead and the metal piece; however, the present invention is not limited thereto. For example, as shown in FIG. 8, a plurality of the metal pieces may be arranged in such a manner that each of the metal pieces be held between two, adjacent to each other, of the overlapped lead connecting portions. Further, as shown in FIG. 9, one metal piece may be arranged in such a manner as to be held between arbitrary two, adjacent to each other, of the overlapped lead connecting portions. It should be noted that the number of the metal pieces may be freely selected and the one or more metal pieces may be arranged at any location or any locations insofar as the electric contact between the lead and the lead connecting portions and a sufficient joining strength therebetween can be ensured by arrangement of the one or more metal pieces.

The nonaqueous electrolyte battery using the electrodes having the above configuration is produced as follows:

A raw negative electrode is produced by coating a metal foil such as a copper foil as a negative collector 12 with a negative mix containing a negative active material and a binder, and drying the negative mix to form a negative active material layer 13 on the negative collector 12. The raw negative electrode is cut into a desired shape, to form a negative electrode 14. As the binder of the negative mix, a known binder can be used, and further known additives may be added to the negative mix. Further, the negative active material layer 13 can be formed by using cast coating or sintering.

A raw positive electrode is produced by coating a metal foil such as a copper foil as a positive collector 16 with a positive mix containing a positive active material and a binder, and drying the positive mix to form a positive active material layer 17 on the positive collector 16. The raw positive electrode is cut into a desired shape, to form a positive electrode 18. As the binder of the positive mix, a known binder can be used, and further known additives may be added to the positive mix. Further, the positive active material layer 17 can be formed by using cast coating or sintering.

The negative electrode 14 has a negative electrode lead connecting portion 19, which is configured as an extension of the negative collector 12, on which the active material layer is not formed, and the positive electrode 18 has a positive electrode lead connecting portion 21, which is configured as an extension of the positive collector 16, on which the active material layer is not formed. The lead connecting portion may be formed by eliminating the formation of the active material layer on an extension of the collector, or forming the active material layer on both the collector and the extension thereof and removing the active material layer formed on the extension of the collector.

A gel-like electrolyte layer 15 is formed on the positive active material layer 17 on the positive electrode 18 in the following manner. First, a nonaqueous electrolytic solution is prepared by dissolving an electrolyte salt in a nonaqueous solvent. A matrix polymer is added to the nonaqueous electrolytic solution, and is dissolved therein by agitation, to obtain a gel-like electrolytic solution.

The positive active material layer 17 is coated with a specific amount of the electrolytic solution and is left at room temperature to gel the matrix polymer. In this way, the gel-like electrolyte layer 15 is formed on the positive active material layer 17.

The positive electrode 18 and the negative electrode 14 are laminated and pressed to each other via the gel-like electrolyte layer 15 in such a manner that the positive electrode lead connecting portion 21 is not overlapped to the negative electrode lead connecting portion 19.

A negative electrode lead 9 is connected to the negative electrode lead connecting portion 19 and a positive electrode lead 10 is connected to the positive electrode lead connecting portion 21, to produce a battery element 7.

A negative electrode lead 9 made from typically nickel and a negative electrode metal piece 20 made from typically nickel are overlapped to and joined to the negative electrode lead connecting portion 19 configured as the extension of the negative collector 12, on which the negative active material layer 13 is not formed. A positive electrode lead 10 made from typically aluminum and a positive electrode metal piece 22 made from typically aluminum are overlapped to and joined to the positive electrode lead connecting portion 21 configured as the extension of the positive collector 16, on which the positive active material layer 17 is not formed.

In particular, the joining of the negative electrode lead 9 and the negative electrode metal piece 20 to the negative electrode lead connecting portion 19, and the joining of the positive electrode lead 10 and the positive electrode metal piece 22 to the positive electrode lead connecting portion 21 are preferably performed by ultrasonic welding. This is effective to make the contact state between the lead and the lead connecting portion significantly desirable without occurrence of cutout or breakage of the joined portion therebetween.

Finally, the battery element 7 is disposed on a laminate sheet made from an insulating material, and sealants 11 are placed on a portion at which the positive electrode lead 10 is to be overlapped to the laminate sheet and a portion at which the negative electrode lead 9 is to be overlapped to the laminate sheet. Subsequently, the laminate sheet is folded into two, followed by heat-seal of three sides S1, S2, and S3 of the laminate sheet, to hold the positive electrode lead 10 and the negative electrode lead 9 in a sealing portion of the laminate sheet and to sealingly contain the battery element 7 in an outer case 8 composed of the laminate sheet. In the state in which the battery element 7 is contained in the outer case 8, the battery element 7 is subjected to heat treatment. In this way, a nonaqueous electrolyte battery is obtained.

In the above-described nonaqueous electrolyte battery according to the embodiment, the battery element 7 has the structure including a stack of one negative electrode 14 and one positive electrode 18; however, the present invention is not limited thereto, but may be applicable to a nonaqueous electrolyte battery in which as shown in FIGS. 14 and 15, the battery element 7 has a structure including a stack of a plurality of electrode sheets in each of which a negative electrode 14 and a positive electrode 18 are stacked to each other.

In the nonaqueous electrolyte battery thus produced, since the metal piece is overlapped to and joined to the joined portion between the lead and the lead connecting portion, the contact state between the lead and the lead connecting portion can be made significantly desirable, to improve the joining strength therebetween and reduce the electric resistance therebetween. In particular, even if each of the collector, that is, the lead connecting portion and the lead is formed of a thin metal foil, the lead and the metal piece can be certainly joined to the lead connecting portion by ultrasonic welding without occurrence of cutout, breakage, and lacking of foil.

In the nonaqueous electrolyte battery of this embodiment, the gel-like electrolyte is used; however, the present invention is not limited thereto. For example, an electrolytic solution obtained by dissolving an electrolyte salt in a nonaqueous solvent or a solid electrolyte may be used. Further, a separator can be interposed between the negative electrode 14 and the positive electrode 18 for preventing physical contact therebetween. As the separator, there can be used a known material used for a separator of a nonaqueous electrolyte battery of this type.

The shape of the nonaqueous electrolyte battery according to this embodiment is not particularly limited but may be suitably selected from a cylindrical shape, a square shape, a coin shape, and the like, and the size thereof may be suitably selected from a thin size, a large size, and the like. Further, the present invention is applicable to both a primary battery and a secondary battery.

The present invention will be more clearly understood by way of the following examples:

EXAMPLE 1

A negative electrode sheet was produced in the following manner.

A negative mix was prepared by mixing 90 parts by weight of a crushed graphite powder as a negative active material and 10 parts by weight of poly(vinylidene fluoride-co-hexafluoropropylene) as a binder. The negative mix was dispersed in N-methyl-2-pyrolidone to be slurried. One surface of a strip-like copper foil having a thickness of 10 µm as a negative collector was coated with the slurry of negative mix, and the negative mix was dried and compressed on the negative collector by a roll press, whereby a negative active material layer was formed on the negative collector. The negative electrode sheet was thus produced. Additionally, an extension of the negative collector, on which the negative active material layer was not formed, was taken as a negative electrode lead connecting portion.

A positive electrode sheet was produced in the following manner.

To obtain $LiCoO_2$ as a positive active material, lithium carbonate and cobalt carbonate were mixed at a mixing ratio of 0.5 mol:1 mol, and were sintered in air at 900° C. for 5 hr. A positive mix was prepared by mixing 90 parts by weight of $LiCoO_2$ as the positive active material thus obtained, 6 parts by weight of graphite as a conductive agent, and 4 parts by weight of poly(vinylidene fluororide-co-hexafluoropropylene) as a binder. The positive mix was dispersed in N-methyl-2-pyrolidone to be slurried. One surface of an aluminum foil having a thickness of 20 µm as a positive collector was coated with the slurry of positive mix, and the positive mix was dried and compressed on the positive collector by a roll press, whereby a positive active material layer was formed on the positive collector. The positive electrode sheet was thus produced. Additionally, an extension of the positive collector, on which the positive active material layer was not formed, was taken as a positive electrode lead connecting portion.

A gel-like electrolyte was produced in the following manner.

The negative electrode sheet and the positive electrode sheet were coated with a solution, which was obtained by mixing and dissolving 30 parts by weight of a plasticizer containing 42.5 parts by weight of ethylene carbonate, 42.5 parts by weight of propylene carbonate, and 15 parts by weight of $LiPF_6$, 10 parts by weight of poly(vinylidene fluoride-co-hexafluoropropylene), and 60 parts by weight of dimethyl carbonate, to be impregnated therewith, and were left at room temperature for 8 hr to remove the dimethyl carbonate by evaporation. The negative electrode sheet and the positive electrode sheet were thus coated with the gel-like electrolyte.

The gel-like electrolyte sides of the negative electrode sheet and the positive electrode sheet thus coated with the gel-like electrolyte were laminated and pressed to each other. In this way, a flat-type electrode sheet having an area of 5 cm×8 cm and a thickness of 0.3 mm was produced.

A lead and a metal piece were joined to each lead connecting portion in the following manner.

A negative electrode lead made from nickel was overlapped to the negative electrode connecting portion of the electrode sheet, and as shown in FIG. 3, a metal piece made from nickel was overlapped to the surface, opposed to the surface on which the negative electrode lead was joined, of the negative electrode lead connecting portion in such a manner that the center of the metal piece was located at a position corresponding to the center of the joined portion between the negative electrode lead and the negative electrode lead connecting portion; and the negative electrode lead and the metal pieces overlapped to the negative electrode lead connecting portion were joined thereto by ultrasonic welding. The negative electrode lead had a length of 20 mm, a width of 5 mm, and a thickness of 0.05 mm. The metal piece had a length of 4 mm, a width of 4 mm, and a thickness of 0.05 mm. The contact area between the negative electrode lead and the negative electrode lead connecting portion was set to 5 mm×5 mm.

A positive electrode lead made from aluminum was overlapped to the positive electrode connecting portion of the electrode sheet, and as shown in FIG. 3, a metal piece made from aluminum was overlapped to the surface, opposed to the surface on which the positive electrode lead was joined, of the positive electrode lead connecting portion in such a manner that the center of the metal piece was located at a position corresponding to the center of the joined portion between the positive electrode lead and the positive electrode lead connecting portion; and the positive electrode lead and the metal pieces overlapped to the positive electrode lead connecting portion were joined thereto by ultrasonic welding. The positive electrode lead had a length of 20 mm, a width of 5 mm, and a thickness of 0.05 mm. The metal piece had a length of 4 mm, a width of 4 mm, and a thickness of 0.05 mm. The contact area between the positive electrode lead and the positive electrode lead connecting portion was set to 5 mm×5 mm.

Finally, one laminate sheet was folded into two, and a battery element in which the leads were joined to the lead connecting portions was sealed in an outer case formed by heat-seal of three sides of the folded laminate sheet, and the negative electrode lead and the positive electrode leads are extracted to the outside of the outer case. A battery was thus produced.

EXAMPLE 2

A battery was produced in the same procedure as that described in Example 1, except that the shape of each of a negative electrode metal piece and a positive electrode metal piece in Example 2 is different from that in Example 1.

A negative electrode lead and a negative electrode metal piece made from nickel were overlapped to a negative electrode lead connecting portion in such a manner that part of the metal piece was protruded from a joined portion between the negative electrode lead and the negative electrode lead connecting portion as shown in FIG. 5, and were then joined thereto by ultrasonic welding. Similarly, a positive electrode lead and a positive electrode metal piece made from aluminum were overlapped to a positive electrode lead connecting portion in such a manner that part of the metal piece was protruded from a joined portion between the positive electrode lead and the positive electrode lead connecting portion as shown in FIG. 5, and were then joined thereto by ultrasonic welding.

Each of the negative electrode metal piece and the positive electrode metal piece had a length of 2 mm, a width of 8 mm, and a thickness of 0.05 mm.

The other steps of the procedure are the same as those in Example 1, and therefore, the overlapped description thereof is omitted.

EXAMPLE 3

A battery was produced in the same procedure as that described in Example 1, except that the shape of each of a negative electrode metal piece and a positive electrode metal piece in Example 3 is different from that in Example 1.

A negative electrode lead and a negative electrode metal piece made from nickel were overlapped to a negative electrode lead connecting portion in such a manner that the metal piece covered a joined portion between the negative electrode lead and the negative electrode lead connecting portion as shown in FIG. 6, and were then joined thereto by ultrasonic welding. Similarly, a positive electrode lead and a positive electrode metal piece made from aluminum were overlapped to a positive electrode lead connecting portion in such a manner that the metal piece covered a joined portion between the positive electrode lead and the positive electrode lead connecting portion as shown in FIG. 6, and were then joined thereto by ultrasonic welding.

Each of the negative electrode metal piece and the positive electrode metal piece had a length of 6 mm, a width of 6 mm, and a thickness of 0.05 mm.

The other steps of the procedure are the same as those in Example 1, and therefore, the overlapped description thereof is omitted.

EXAMPLE 4

Electrode sheets, in each of which a negative electrode sheet, a gal-like electrolyte, and a positive electrode sheet were stacked, were prepared in the same manner as that described in Example 1.

Four pieces of these electrode sheets were stacked while being alternately turned back so that the negative electrode of one electrode sheet was in contact with the negative electrode of the corresponding turned-back electrode sheet and the positive electrode of one electrode sheet was in contact with the positive electrode of the corresponding turned-back electrode sheet.

A battery element was produced by joining leads to lead connecting portions of the stacked electrode sheets in the following manner.

The negative electrode lead connecting portions extending from the negative electrode sheets were overlapped to each other. The negative electrode lead made from nickel was overlapped to the outermost one of the negative electrode lead connecting portions. Then, as shown in FIG. 7, a negative electrode metal piece was overlapped to the outermost one, opposed to the side on which the negative electrode lead was overlapped, of the overlapped negative electrode lead connecting portions at a position corresponding to an approximately central area of the overlapped portion between the negative electrode lead and the negative electrode lead connecting portions. The overlapped negative electrode lead connecting portions, the negative electrode lead, and the negative electrode metal piece were joined to each other by ultrasonic welding. The negative electrode lead had a length of 20 mm, a width of 5 mm, and a thickness of 0.05 mm. The metal piece had a length of 4 mm, a width of 4 mm, and a thickness of 0.05 mm. The contact area between the negative electrode lead connecting portions and the negative electrode lead was set to 5 mm×5 mm.

The positive electrode lead connecting portions extending from the positive electrode sheets were overlapped to each other. The positive electrode lead made from nickel was overlapped to the outermost one of the positive electrode lead connecting portions. Then, as shown in FIG. 7, a positive electrode metal piece was overlapped to the outermost one, opposed to the side on which the positive electrode lead was overlapped, of the overlapped positive electrode lead connecting portions at a position corresponding to an approximately central area of the overlapped portion between the positive electrode lead and the positive electrode lead connecting portions. The overlapped positive electrode lead connecting portions, the positive electrode lead, and the positive electrode metal piece were joined to each other by ultrasonic welding. The positive electrode lead had a length of 20 mm, a width of 5 mm, and a thickness of 0.05 mm. The metal piece had a length of 4 mm, a width of 4 mm, and a thickness of 0.05 mm. The contact area between the positive electrode lead connecting portions and the positive electrode lead was set to 5 mm×5 mm.

Finally, one laminate sheet was folded into two, and the battery element, in which the leads were joined to the lead connecting portions, was sealed in an outer case formed by heat-seal of three sides of the laminate sheet, and the negative electrode lead and the positive electrode lead were extracted to the outside of the outer case. A battery was thus produced.

EXAMPLE 5

A battery was produced in the same procedure as that described in Example 4, except that a plurality of negative electrode metal pieces and a plurality of positive electrode metal pieces were used.

A stack of four electrode sheets were prepared in the same manner as that described in Example 4.

A battery element was produced by joining leads to lead connecting portions of the stacked electrode sheets in the following manner.

The negative electrode lead connecting portions extending from the negative electrode sheets were overlapped to each other. The negative electrode lead made from nickel was overlapped to the outermost one of the overlapped negative electrode lead connecting portions. Then, as shown in FIG. 8, each of four negative electrode metal pieces was held between two, adjacent to each other, of the negative electrode lead connecting portions at a position corresponding to an approximately central area of the overlapped portion between the negative electrode lead and the negative electrode lead connecting portions. The overlapped negative electrode lead connecting portions, the negative electrode lead, and the metal pieces were joined to each other by ultrasonic welding.

The positive electrode lead connecting portions extending from the positive electrode sheets were overlapped to each other. The positive electrode lead made from nickel was overlapped to the outermost one of the overlapped positive electrode lead connecting portions. Then, as shown in FIG. 8, each of four positive electrode metal pieces was held between two, adjacent to each other, of the positive electrode lead connecting portions at a position corresponding to an approximately central area of the overlapped portion between the positive electrode lead and the positive electrode lead connecting portions. The overlapped positive electrode lead connecting portions, the positive electrode lead, and the metal pieces were joined to each other by ultrasonic welding.

The other steps of the procedure are the same as those in Example 4, and therefore, the overlapped description thereof is omitted.

EXAMPLE 6

A battery was produced in the same procedure as that described in Example 4, except that each of a negative electrode metal piece and a positive electrode metal piece was joined at a position different from that in Example 4.

A stack of four electrode sheets were prepared in the same manner as that described in Example 4.

A battery element was produced by joining leads to lead connecting portions of the stacked electrode sheets in the following manner.

The negative electrode lead connecting portions extending from the negative electrode sheets were overlapped to each other. The negative electrode lead made from nickel was overlapped to the outermost one of the overlapped negative electrode lead connecting portions. As shown in FIG. 9, a negative electrode metal piece was held between arbitrary two, adjacent to each other, of the negative electrode lead connecting portions at a position corresponding to an approximately central area of the overlapped portion between the negative electrode lead and the negative electrode lead connecting portions. The overlapped negative electrode lead connecting portions, the negative electrode lead, and the metal pieces were joined to each other by ultrasonic welding.

The positive electrode lead connecting portions extending from the positive electrode sheets were overlapped to each other. The positive electrode lead made from nickel was overlapped to the outermost one of the overlapped positive electrode lead connecting portions. As shown in FIG. 9, a positive electrode metal piece was held between arbitrary two, adjacent to each other, of the positive electrode lead connecting portions at a position corresponding to an approximately central area of the overlapped portion between the positive electrode lead and the positive electrode lead connecting portions. The overlapped positive electrode lead connecting portions, the positive electrode lead, and the metal pieces were joined to each other by ultrasonic welding.

The other steps of the procedure are the same as those in Example 4, and therefore, the overlapped description thereof is omitted.

EXAMPLE 7

A battery was produced in the same procedure as that described in Example 1, except that a negative electrode metal piece was made from copper.

A negative electrode lead connecting portion, a negative electrode lead, and a negative electrode metal piece made from copper were overlapped to each other as shown in FIG. 3, and were joined to each other by ultrasonic welding. A positive electrode lead connecting portion, a positive electrode lead, and a positive electrode metal piece made from aluminum were overlapped to each other as shown in FIG. 3, and were joined to each other by ultrasonic welding.

The other steps of the procedure are the same as those in Example 1, and therefore, the overlapped description thereof is omitted.

EXAMPLE 8

A battery was produced in the same procedure as that described in Example 1, except that the positive electrode metal piece in Example 1 was not used.

A negative electrode lead connecting portion, a negative electrode lead, and a negative electrode metal piece made from nickel were overlapped to each other as shown in FIG. 3, and were joined to each other by ultrasonic welding. A positive electrode lead connecting portion and a positive electrode lead were overlapped to each other as shown in FIG. 15, and were joined to each other by ultrasonic welding.

The other steps of the procedure are the same as those in Example 1, and therefore, the overlapped description thereof is omitted.

EXAMPLE 9

A battery was produced in the same procedure as that described in Example 1, except that the thickness of each of a negative electrode metal piece and a positive electrode metal piece was different from that in Example 1.

A negative electrode lead connecting portion, a negative electrode lead, and a negative electrode metal piece made from nickel were overlapped to each other as shown in FIG. 3, and were joined to each other by ultrasonic welding. A positive electrode lead connecting portion, a positive electrode lead, and a positive electrode metal piece made from aluminum were overlapped to each other as shown in FIG. 3, and were joined to each other by ultrasonic welding.

Each of the negative electrode metal piece and the positive electrode metal piece had a length of 4 mm, a width of 4 mm, and a thickness of 0.03 mm.

The other steps of the procedure are the same as those in Example 1, and therefore, the overlapped description thereof is omitted.

EXAMPLE 10

A battery was produced in the same procedure as that described in Example 1, except that the thickness of each of a negative electrode metal piece and a positive electrode metal piece was different from that in Example 1.

A negative electrode lead connecting portion, a negative electrode lead, and a negative electrode metal piece made from nickel were overlapped to each other as shown in FIG. 3, and were joined to each other by ultrasonic welding. A positive electrode lead connecting portion, a positive electrode lead, and a positive electrode metal piece made from aluminum were overlapped to each other as shown in FIG. 3, and were joined to each other by ultrasonic welding.

Each of the negative electrode metal piece and the positive electrode metal piece had a length of 4 mm, a width of 4 mm, and a thickness of 0.015 mm.

The other steps of the procedure are the same as those in Example 1, and therefore, the overlapped description thereof is omitted.

COMPARATIVE EXAMPLE 1

A battery was produced in the same procedure as that described in Example 1, except that the negative electrode metal piece and the positive electrode metal piece used in Example 1 were not used.

Figure 1:
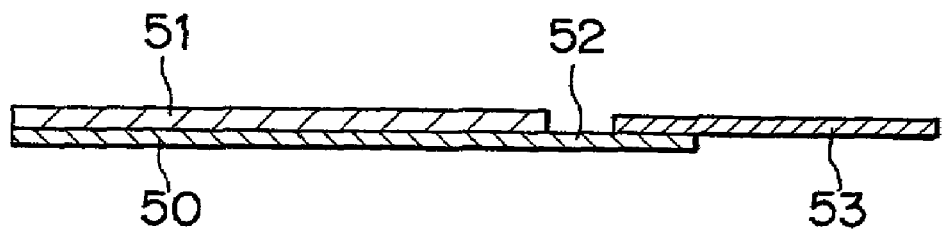
FIG. 1 is a sectional view showing a joined portion between a lead and a related art electrode.

A negative electrode connecting portion and a negative electrode lead were overlapped to each other as shown in FIG. 1, and were joined to each other by ultrasonic welding. A positive electrode connecting portion and a positive electrode lead were overlapped to each other as shown in FIG. 1, and were joined to each other by ultrasonic welding.

The other steps of the procedure are the same as those in Example 1, and therefore, the overlapped description thereof is omitted.

COMPARATIVE EXAMPLE 2

A battery was produced in the same procedure as that described in Example 4, except that the negative electrode metal piece and the positive electrode metal piece used in Example 4 were not used.

Figure 2:
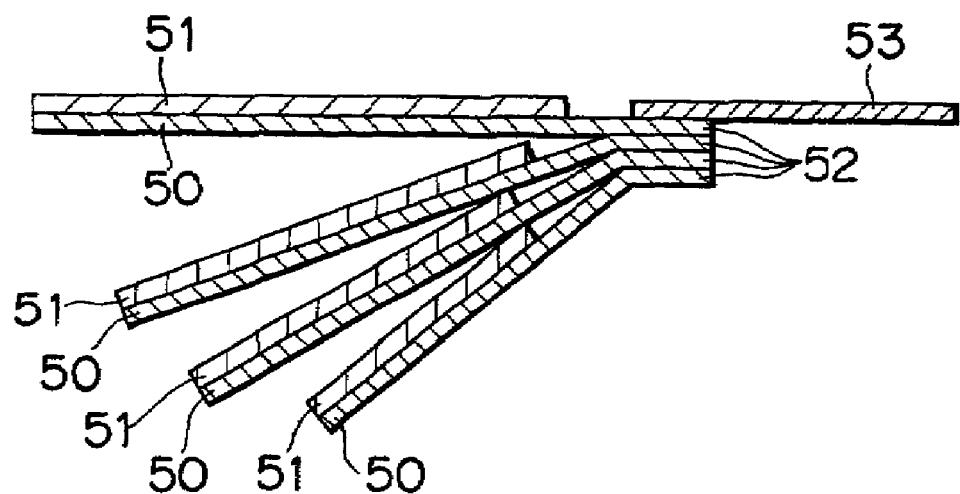
FIG. 2 is a sectional view showing a joined portion between a lead and another related art electrode having a stack of a plurality of electrode sheets.

A negative electrode lead and a plurality of negative electrode connecting portions were overlapped to each other as shown in FIG. 2, and were joined to each other by ultrasonic welding. A positive electrode lead and a plurality of positive electrode connecting portions were overlapped to each other as shown in FIG. 2, and were joined to each other by ultrasonic welding.

The other steps of the procedure are the same as those in Example 4, and therefore, the overlapped description thereof is omitted.

With respect to each of the batteries produced in Examples 1 to 10 and Comparative Examples 1 and 2, direct current resistances and joining strengths of the joined portions between the lead and the negative electrode lead connecting portion and between the lead and the positive electrode lead connecting portion, and a battery load characteristic were measured.

(1) Direct Current Resistance

In the case of the single electrode, a direct current resistance of the joined portion between the lead and the lead connecting portion was obtained by subtracting a resistance of the electrode excluding the lead connecting portion and a resistance of the lead from a measured value of direct current resistance of a portion between the tip of the lead and the terminal, opposed to the lead, of the electrode. In the case of a plurality of the electrodes, the electrode separated furthest from the lead is selected, and a direct current resistance of the joined portion between the lead and the lead connecting portion was obtained by subtracting a resistance of the electrode excluding the lead connecting portion and a resistance of the lead from a measured value of direct current resistance of a portion between the tip of the lead and the terminal, opposed to the lead, of the electrode. The result was expressed in a relative ratio with the direct current resistance of the lead connecting portion in Comparative Example 1 taken as 1.

(2) Joining Strength

A joining strength of the joined portion between the lead and the lead connecting portion was measured by pulling the lead and the electrode in the opposed directions. The result was expressed in a relative ratio with the joining strength in Comparative Example 1 taken as 1.

(3) Battery Load Characteristic

Each battery was charged with a constant current and a constant voltage at a 10 hour rate of the theoretical capacity to an upper limit of 4.2 V at 23° C. for 30 hr, and was discharged with a constant current at each of 10 hour rate (1/10 C) and 1/3 hour rate (3 C) to a terminal voltage of 3 V. The discharge capacity of the battery was thus determined, and an output at the time of discharge at each hour rate was determined on the basis of an average voltage calculated from the discharge capacity of the battery. The result was expressed in a ratio of the output at the time of discharge at 3 C hour rate with the output at the time of discharge at 1/10 C taken as 100.

The size, thickness, and material of the metal piece, the number of the electrode sheets, and the reference drawing of each of the batteries in Examples 1 to 10 and Comparative Examples 1 and 2 are shown in Table 1.

battery in Comparative Example 1 in which the metal piece is not joined to the joined portion between the lead and the lead connecting portion.

In comparison of the battery in Each of Examples 1 to 3 with the battery in Comparative Example 1, it becomes apparent that the use of the metal piece is effective to improve the joining strength and the battery load characteristic and to reduce the direct current resistance irrespective of the shape of the metal piece.

In the battery in Example 7 in which the negative electrode metal piece is made from copper, the joining strength on the negative electrode side and the battery load characteristic are further improved, and the direct current resis-

TABLE 1

| | negative electrode metal piece | | | | positive electrode metal piece | | | | number of electrode sheets |
|---|---|---|---|---|---|---|---|---|---|
| | size (mm) | thickness (mm) | material | reference drawing | size (mm) | thickness (mm) | material | reference drawing | |
| Example 1 | 4 × 4 | 0.05 | Ni | FIG. 3 | 4 × 4 | 0.05 | Al | FIG. 3 | 1 |
| Example 2 | 8 × 2 | 0.05 | Ni | FIG. 5 | 8 × 2 | 0.05 | Al | FIG. 5 | 1 |
| Example 3 | 6 × 6 | 0.05 | Ni | FIG. 6 | 6 × 6 | 0.05 | Al | FIG. 6 | 1 |
| Example 4 | 4 × 4 | 0.05 | Ni | FIG. 7 | 4 × 4 | 0.05 | Al | FIG. 7 | 4 |
| Example 5 | 4 × 4 | 0.05 | Ni | FIG. 8 | 4 × 4 | 0.05 | Al | FIG. 8 | 4 |
| Example 6 | 4 × 4 | 0.05 | Ni | FIG. 9 | 4 × 4 | 0.05 | Al | FIG. 9 | 4 |
| Example 7 | 4 × 4 | 0.05 | Cu | FIG. 3 | 4 × 4 | 0.05 | Al | FIG. 3 | 1 |
| Example 8 | 4 × 4 | 0.05 | Ni | FIG. 3 | — | — | — | FIG. 15 | 1 |
| Example 9 | 4 × 4 | 0.03 | Ni | FIG. 3 | 4 × 4 | 0.03 | Al | FIG. 3 | 1 |
| Example 10 | 4 × 4 | 0.015 | Ni | FIG. 3 | 4 × 4 | 0.015 | Al | FIG. 3 | 1 |
| Comparative Example 1 | — | — | — | FIG. 1 | — | — | — | FIG. 1 | 1 |
| Comparative Example 2 | — | — | — | FIG. 2 | — | — | — | FIG. 2 | 4 |

The results of evaluating the direct current resistance, the joining strength, and the battery load characteristic of each of the batteries in Examples 1 to 10 and Comparative Example 1 and 2 are shown in Table 2.

tance is further reduced. As a result, it becomes apparent that the use of the metal piece made from the same material as that of the collector is effective to further enhance the characteristics.

TABLE 2

| | negative electrode | | | positive electrode | | | battery load characteristic |
|---|---|---|---|---|---|---|---|
| | reference drawing | strength | direct current resistance | reference drawing | strength | direct current resistance | |
| Example 1 | FIG. 3 | 2.1 | 0.7 | FIG. 3 | 1.9 | 0.85 | 90 |
| Example 2 | FIG. 5 | 1.6 | 0.8 | FIG. 5 | 1.5 | 0.9 | 88 |
| Example 3 | FIG. 6 | 2.2 | 0.65 | FIG. 6 | 2.1 | 0.8 | 90 |
| Example 4 | FIG. 7 | 2.5 | 0.65 | FIG. 7 | 2.2 | 0.85 | 93 |
| Example 5 | FIG. 8 | 1.9 | 0.7 | FIG. 8 | 2.7 | 0.85 | 92 |
| Example 6 | FIG. 9 | 2.4 | 0.7 | FIG. 9 | 2.6 | 0.8 | 91 |
| Example 7 | FIG. 3 | 2.3 | 0.6 | FIG. 3 | 1.9 | 0.85 | 93 |
| Example 8 | FIG. 3 | 2.1 | 0.7 | FIG. 15 | 1 | 1 | 90 |
| Example 9 | FIG. 3 | 1.5 | 0.8 | FIG. 3 | 1.5 | 0.85 | 90 |
| Example 10 | FIG. 3 | 1.2 | 0.9 | FIG. 3 | 1.2 | 0.9 | 85 |
| Comparative Example 1 | FIG. 1 | 1 | 1 | FIG. 1 | 1 | 1 | 70 |
| Comparative Example 2 | FIG. 2 | 1.2 | 1.3 | FIG. 2 | 1.2 | 1.1 | 75 |

As is apparent from the results shown in Table 2, the battery in each of Examples 1 to 3 in which the metal piece is jointed to the joined portion between the lead and the lead connecting portion is superior in joining strength, direct current resistance, and battery load characteristic to the In the battery in Example 8 in which the positive electrode metal piece is not used, the battery load characteristic is not degraded. As a result, it becomes apparent that the use of the metal piece for connection of the negative lead to the negative electrode lead connecting portion is particularly effective to improve the performance of the battery.

In the battery in Example 10 in which the thickness of the metal piece is 0.015 mm, the joining strength and the battery load characteristic is degraded and the direct current resistance is increased as compared with the battery in Example 9 in which the thickness of the metal piece is 0.03 mm. As a result, it becomes apparent that the thickness of the metal piece is desirable to be in a range of 0.03 mm or more.

In comparison of the battery in each of Examples 4 to 6 with the battery in Comparative Example 2, it becomes apparent that in the case of stacking a plurality of electrode sheets to each other, the use of the metal piece or metal pieces is effective to improve the joining strength and the battery load characteristic and reduce the direct current resistance irrespective of the number of the metal pieces and the joined position or joined positions of the metal piece or metal pieces.

While the preferred embodiments of the present invention have been described using the specific terms, such description is for illustrative purposes only, and it is to be understood that changes and variations may be made without departing from the spirit or scope of the following claims.

What is claimed is:

1. A battery contained in a laminate sheet having an electrode comprising:

a plurality of electrode sheets, each electrode sheet having a collector, an active material layer formed on said collector, and a lead connecting portion which is configured as an exposed extension of said collector, on both surfaces of which said active material layer is not formed;

a lead; and a plurality of metal pieces, wherein, the lead connecting portions, the lead and the metal pieces are positioned in a stacked and overlapped relationship, and at least one of the lead connecting portions is sandwiched between a couple of adjacent metal pieces, the collectors and the lead are formed of metal foil, and each of the metal pieces is ultrasonically welded to at least one of the lead connecting portions and the lead, an area of one principal plane of each of the metal pieces is less than a contact area between the lead and the lead connecting portion, and each of the metal pieces is positioned in a stack to overlap the contact area.

2. The battery according to claim 1, wherein each of said metal pieces is made from the same kind of material as that of said lead and/or said collectors.

3. The battery according to claim 1, wherein the thickness of each of said metal pieces is in a range of 0.03 mm or more.

4. A battery contained in a laminate sheet, the battery including a negative electrode, a positive electrode, and an electrolyte, and at least one of said negative electrode and said positive electrode comprising:

a plurality of electrode sheets, each electrode sheet having a collector, an active material layer formed on said collector, and a lead connecting portion which is configured as an exposed extension of said collector, on both surfaces of which said active material layer is not formed;

a lead; and a plurality of metal pieces, wherein, the lead connecting portions, the lead and the metal pieces are positioned in a stacked and overlapped relationship, and at least one of the lead connecting portions is sandwiched between a couple of adjacent metal pieces, the collectors and the lead are formed of metal foil, and each of the metal pieces is ultrasonically welded to at least one of the lead connecting portions and the lead, an area of one principal plane of each of the metal pieces is less than a contact area between the lead and the lead connecting portion, and each of the metal pieces is positioned in a stack to overlap the contact area.

5. The battery according to claim 4, wherein each of said metal pieces is made from the same kind of material as that of said lead and/or said collectors.

6. The battery according to claim 4, wherein the thickness of each of said metal pieces is in a range of 0.03 mm or more.

7. The battery according to claim 4, wherein said negative electrode contains a material to or from which lithium can be doped or released.

8. The battery according to claim 7, wherein said material to or from which lithium can be doped or released is a carbon material.

9. The battery according to claim 4, wherein said positive electrode contains a composite oxide of lithium and a transition metal.

10. The battery according to claim 4, wherein said electrolyte is dissolved in a nonaqueous solvent.

11. The battery according to claim 4, wherein said electrolyte is dispersed in a matrix high polymer.

12. The battery according to claim 11, wherein said matrix high polymer is gelled by a plasticizer.

13. A battery according to claim 4, wherein said negative electrode comprises:

the plurality of electrode sheets, each electrode sheet having the collector, the active material layer formed on the collector, and the lead connecting portion which is configured as the exposed extension of said collector, on both surfaces of which the active material is not formed;

the lead; and the plurality of metal pieces, wherein, the lead connecting portions, the lead and the metal pieces are positioned in the stacked and overlapped relationship, and at least one of the lead connecting portions is sandwiched between a couple of adjacent metal pieces, the collectors and the lead are formed of metal foil, and each of the metal pieces is ultrasonically welded to at least one of the lead connecting portions and the lead.

* * * * *